US011960248B2

(12) United States Patent
Ummel et al.

(10) Patent No.: US 11,960,248 B2
(45) Date of Patent: Apr. 16, 2024

(54) DEWAR DEVICE COMPRISING A PIVOTING BEZEL

(71) Applicant: Omega SA, Biel/Bienne (CH)

(72) Inventors: Antoine Ummel, Neuchatel (CH); Serge Droz, Bole (CH)

(73) Assignee: Omega SA, Biel/Bienne (CH)

( * ) Notice: Subject to any disclaimer, the term of this patent is extended or adjusted under 35 U.S.C. 154(b) by 46 days.

(21) Appl. No.: 17/658,867

(22) Filed: Apr. 12, 2022

(65) Prior Publication Data

US 2022/0404776 A1 Dec. 22, 2022

(30) Foreign Application Priority Data

Jun. 18, 2021 (EP) .................................... 21180332

(51) Int. Cl.

| | |
|---|---|
| ***G04G 17/08*** | (2006.01) |
| ***G04B 3/04*** | (2006.01) |
| ***G04B 3/08*** | (2006.01) |
| ***G04B 37/02*** | (2006.01) |
| ***G04B 43/00*** | (2006.01) |
| ***G04G 9/00*** | (2006.01) |

(52) U.S. Cl.

CPC ............ *G04G 17/08* (2013.01); *G04B 3/048* (2013.01); *G04B 3/08* (2013.01); *G04B 37/02* (2013.01); *G04B 43/005* (2013.01); *G04G 9/0094* (2013.01)

(58) Field of Classification Search

CPC ...... G04G 17/08; G04G 9/0094; G04B 37/02; G04B 43/005; G04B 3/048; G04B 3/08

See application file for complete search history.

(56) References Cited

U.S. PATENT DOCUMENTS

| | | | | |
|---|---|---|---|---|
| 3,030,763 A * | 4/1962 | Klingenberg | .......... | G04B 39/02 368/291 |
| 3,740,944 A * | 6/1973 | Chopard | .............. | G04B 43/005 368/286 |
| 6,535,461 B1 * | 3/2003 | Karhu | .................... | G04C 3/001 379/430 |

FOREIGN PATENT DOCUMENTS

| | | | |
|---|---|---|---|
| CH | 716 913 | A2 | 6/2021 |
| CN | 205176489 | U | 4/2016 |
| DE | 1 943 087 | A1 | 3/1971 |
| JP | 2009-229167 | A | 10/2009 |
| WO | WO 2018/215491 | A1 | 11/2018 |

OTHER PUBLICATIONS

European Search Report dated Nov. 24, 2021 in European Application 21180332.5 filed on Jun. 18, 2021, 3 pages (with English Translation of Categories of Cited Documents).

* cited by examiner

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A Dewar device for mechanical and/or functional components of a watch, the device being provided with a bracelet and a casing including an enclosure wherein a case of the watch can be disposed so that a crystal of the case is arranged opposite a crystal of all the elements of the casing defining this enclosure and at least one fastening device fastening the watch case in the enclosure of the casing by keeping it remote from all the elements of the casing defining this enclosure, the Dewar device including a device for actuating at least one push button by rotating a pivoting bezel of the casing.

12 Claims, 2 Drawing Sheets

DEWAR DEVICE COMPRISING A PIVOTING BEZEL

CROSS-REFERENCE TO RELATED APPLICATION

This application claims priority to European Patent Application No. 21180332.5 filed on Jun. 18, 2021, the entire disclosure of which is hereby incorporated herein by reference.

TECHNICAL FIELD OF THE INVENTION

The present invention relates to a Dewar device for mechanical and/or functional components of a watch, the device comprising a device for actuating at least one push button of a watch comprised in an enclosure of the device to from in particular a pivoting bezel of said casing.

TECHNOLOGICAL BACKGROUND

A watch and in particular an electronic watch conventionally comprises a bracelet and a watch case including several electrical or electronic components. It is known in the prior art that some of these components cannot withstand extreme temperatures, and cease to operate correctly at these temperatures. Typically, LCD Liquid Crystal Displays using light-emitting diodes or quartz tolerate temperatures not exceeding approximately 80° C. (degrees Celcius), and not dropping below 0° C. However, in particular environments such as for example space or lunar missions, the temperatures can frequently reach values of the order of substantially −150° C. to +125° C.

There is therefore a need to be able to use a watch, in particular an electronic watch, in environments where such extreme temperatures can prevail.

SUMMARY OF THE INVENTION

The invention relates to a Dewar device for mechanical and/or functional components of a watch, said device being provided with a bracelet and a casing including an enclosure wherein a case of said watch can be disposed so that a crystal of said case is arranged opposite a crystal of all the elements of the casing defining this enclosure and at least one fastening device fastening said watch case in said enclosure of the casing by keeping it remote from all the elements of the casing defining this enclosure, said Dewar device comprising a device for actuating at least one push button by rotating a pivoting bezel of said casing.

In other embodiments:

- said device for actuating said at least one push button comprises said pivoting bezel which is configured to participate in the actuation of said at least one push button when it performs a rotational movement around its central axis;
- said pivoting bezel is movable in rotation relative to the middle of the casing;
- the actuating device comprises the pivoting bezel, the middle of the casing and at least one deformable lever element;
- said at least one lever element comprises a first end fastened to a middle of the casing and a second end fastened to the bezel;
- said at least one lever element comprises first and second parts of different sizes movably connected together by a fastening element;

- said at least one lever element comprises connecting elements capable of ensuring a movable fastening of this lever element to the middle and to the bezel of the casing;
- said first and second parts are interconnected at connecting ends forming an actuation area of said at least one lever element;
- said at least one lever element comprises an actuation area capable of activating the push button of the watch by contacting at least one activation area of the middle;
- the activation area comprises a sliding member, in particular a push button, arranged in the middle capable of contacting the push button of the watch when it is acted upon by said at least one lever element;
- said at least one lever element comprises an actuation area capable of activating the push button of the watch by directly contacting said button;
- said enclosure is under vacuum or almost under vacuum.

BRIEF DESCRIPTION OF THE FIGURES

Other features and advantages will emerge clearly from the description given below, in an indicative and non-limiting manner, with reference to the following appended figures.

DETAILED DESCRIPTION OF THE INVENTION

Figure 1:
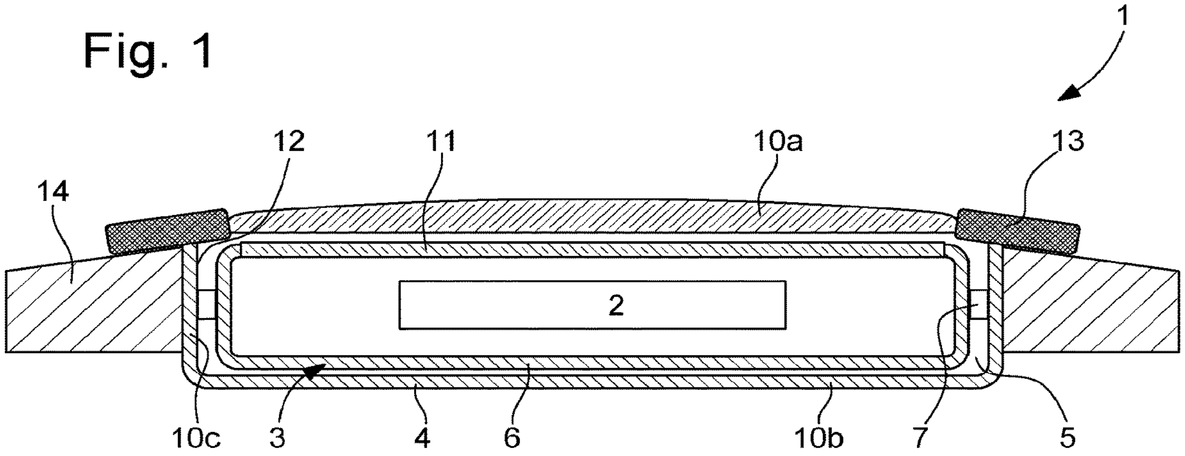
FIG. 1 is a sectional view of a schematic representation of a Dewar device for mechanical and/or functional components of a watch provided with a device for actuating at least one push button of a watch, according to one embodiment of the invention.

FIG. 1 shows a schematic representation of an isothermal timepiece device 1 for mechanical and/or functional components 2 of a watch 3 also called "Dewar timepiece device" or "protection device" or more simply in the continuation of the description "Dewar device". Such a Dewar device 1 is capable of participating in particular in providing good thermal insulation to mechanical and/or functional components 2 of the watch 3, the case 6 of which is arranged in the casing 4 of this device 1.

This Dewar device 1 is in particular formed by the combination of its casing 4 and the watch 3 case 6 in order to achieve an appropriate thermal insulation for these mechanical and/or functional components 2. In this configuration, the watch 3 case 6 is arranged in an enclosure 5 of the casing 4 while being kept remote or at a distance from all the elements 10_a_ to 10_c_ of the casing 4 defining this said enclosure 5, namely the crystal 10_a_, an inner peripheral wall 12 of a middle 10_c_ and a back 10_b_ of this casing 4. It will be noted that this inner peripheral wall 12 is also that of said enclosure 5.

In this context, this device 1 therefore comprises the casing 4 which includes the middle 10_c_ preferably provided with two pairs of horns 14 on which is mounted a bracelet allowing a user of this device 1 to wear it for example on the wrist. This casing 4 also includes a crystal 10_a_ and back 10_b_ visible in FIG. 1. In this device 1, it will be noted that the crystal 10_a_ preferably comprises a surface which is substantially greater than or strictly greater than a crystal 11 of the watch 3 case 6.

This casing 4 also comprises a pivoting bezel 13 which is rotatably mounted relative to the middle 10*c*. Such a bezel 13 has an essentially circular shape. It comprises a body having inner and outer peripheral walls as well as inner and outer faces, the outer face possibly being provided with a graduation.

Figure 2:
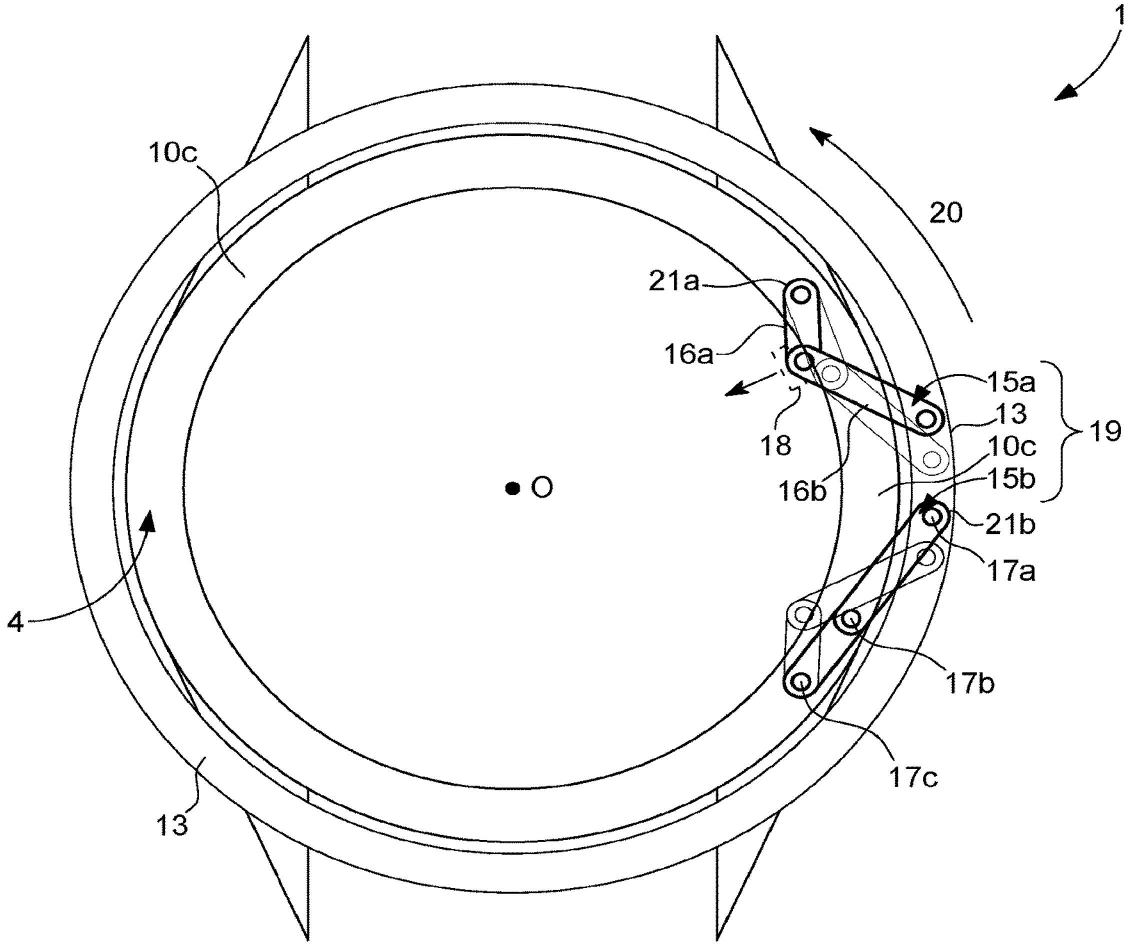
FIGS. 2 to 4 are functional schematic representations describing the various operating modes relating to the implementation of the actuation device, according to the embodiment of the invention.
Figure 3:
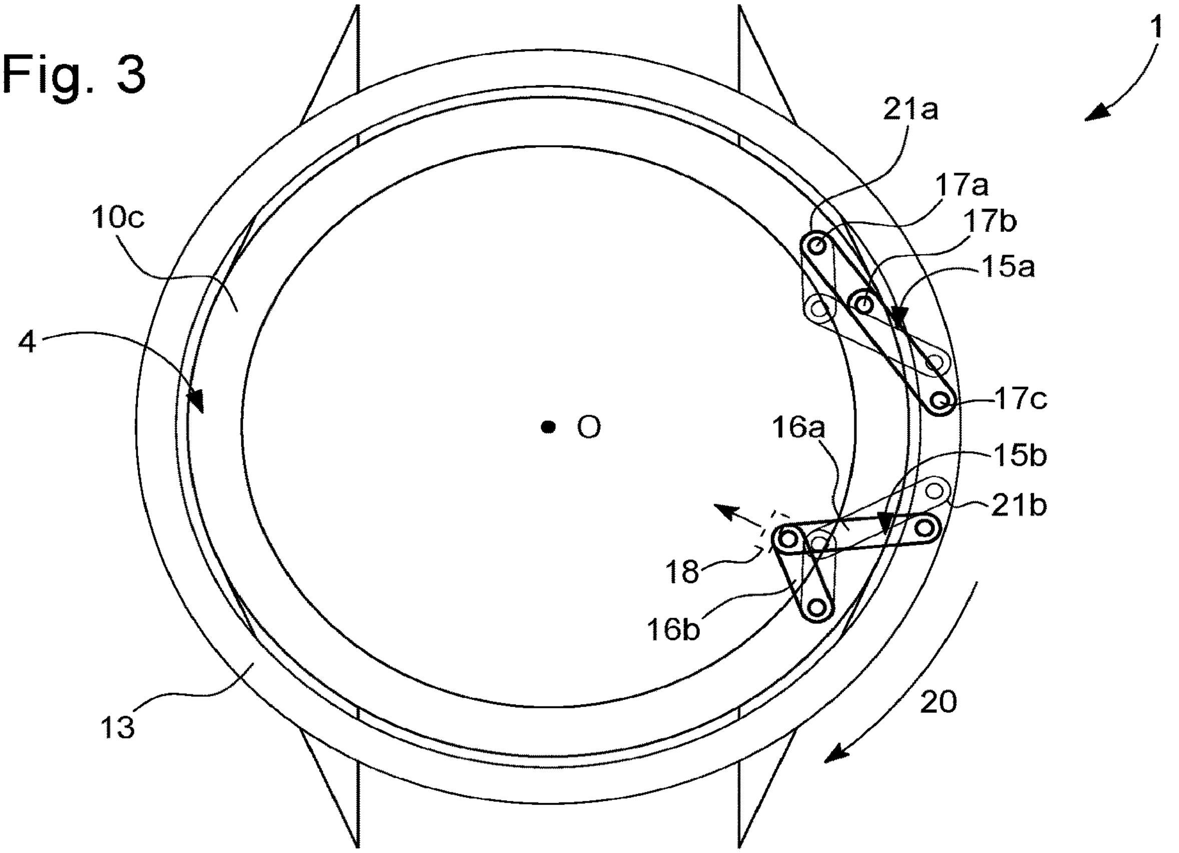

This Dewar device 1 also comprises a device 19 for actuating, by rotation of the bezel 13, at least one push button of the case 6 of the watch 3 arranged in the enclosure 5 of its casing 4. This actuation device 19 therefore comprises the pivoting bezel 13, the middle 10*c* of the casing 4 and at least one deformable lever element 15*a*, 15*b*. In FIGS. 2 to 3, this device 19 comprises two lever elements 15*a*, 15*b* each capable of actuating a push button of the case 6 of the watch 3.

Each deformable lever element 15*a*, 15*b* is capable of switching from a state called "inactivation" state during which the first and second parts 16*a*, 16*b* together form an obtuse angle to a state called "activation" state in which these first and second parts 16*a*, 16*b* form an angle less than or equal to a right angle. In this activation state, this lever element 15*a*, 15*b* has a bent shape substantially similar to that of the letter "L" which is generated by the rotational movement 20 of the bezel 13 when handled by the user/wearer of the Dewar device 1, with the purpose of activating the push button of the watch 3.

Such a deformable lever element 15*a*, 15*b* comprises a first end 21*a* movably fastened to a body of the middle 10*c* of the casing 4 from one of the fastening elements 17*c* which compose it. More specifically, this first end 21*a* is movably fastened to this body of the middle 10*c* around a first common axis with the central axis of the fastening element 17*c*. This lever element 15*a*, 15*b* also comprises a second end 21*b* fastened to the body of the bezel 13 from another fastening element 17*c* of this actuating device 19. Again, this second end 21*b* is movably fastened to this body of the middle 10*c* around a second common axis with the central axis of the corresponding fastening element 17*c*. It will be noted that these first and second axes are substantially parallel or strictly parallel to each other and to a central axis O of the casing 4 and therefore of the middle 10*c* and of the bezel 13.

Each lever element 15*a*, 15*b* therefore also comprises the fastening elements 17*a*, 17*b*, 17*c* mentioned above as well as first and second parts 16*a*, 16*b* which are preferably rigid and/or of different sizes. These first and second parts 16*a*, 16*b* are connected together at ends called connecting ends from the connecting element referenced 17*b*. In this configuration, the first part 16*a* which has a smaller size than the second part 16*b* comprises the first end 21*a* of the lever element 15*a*, 15*b* which is connected to the middle 10*c* and its connecting end which is connected to that of the second part 16*b*. As regards the second part 16*b*, it comprises the second end 21*b* of the lever element 15*a*, 15*b* which is connected to the bezel 13 and its connecting end which is connected to that of the first part 16*a*.

The connecting ends together form an actuation area 18 of the lever element 15*a*, 15*b*. The first and second parts 16*a*, 16*b* of the lever element 15*a*, 15*b* are interconnected so as to be movable relative to each other, around a third axis common with the central axis of the corresponding fastening element 17*b* which connects them together. It will be noted that this third axis is substantially parallel or strictly parallel to the first and second axes mentioned above.

As mentioned previously, the actuation area 18 formed by these two connecting ends is capable of participating in the activation of the push button of the watch when the pivoting bezel 13 is driven by the wearer of the Dewar device in a rotational movement 20.

This activation of the push button is preferably indirect. Indeed, the actuation area 18 is capable of activating the push button of the watch 3 by indirectly contacting the latter, via an activation area of the middle 10*c*. This activation area can comprise a sliding member, in particular a push button arranged in the middle 10*c* and which is capable of directly contacting the push button of the watch 3 when it is acted upon by this activation area. Alternatively, this activation area can be a portion of the peripheral wall of the middle 10*c* which is capable of deforming in order to contact the push button of the watch 3. In this configuration, this activation area is part of the actuation device 19.

In other embodiments of the invention, this activation can be direct when this actuation area 18 directly contacts this push button.

Furthermore, the Dewar device 1 may comprise a housing defined both in the body of the bezel 13 and of the middle 10*c* and wherein the lever element 15*a*, 15*b* may be arranged. In this context, the actuation area 18 of this lever element 15*a*, 15*b* is then capable of moving in this housing in the direction of the push button of the watch or on the contrary of moving away from said push button according to the rotational movement performed by the pivoting bezel 13.

Figure 4:
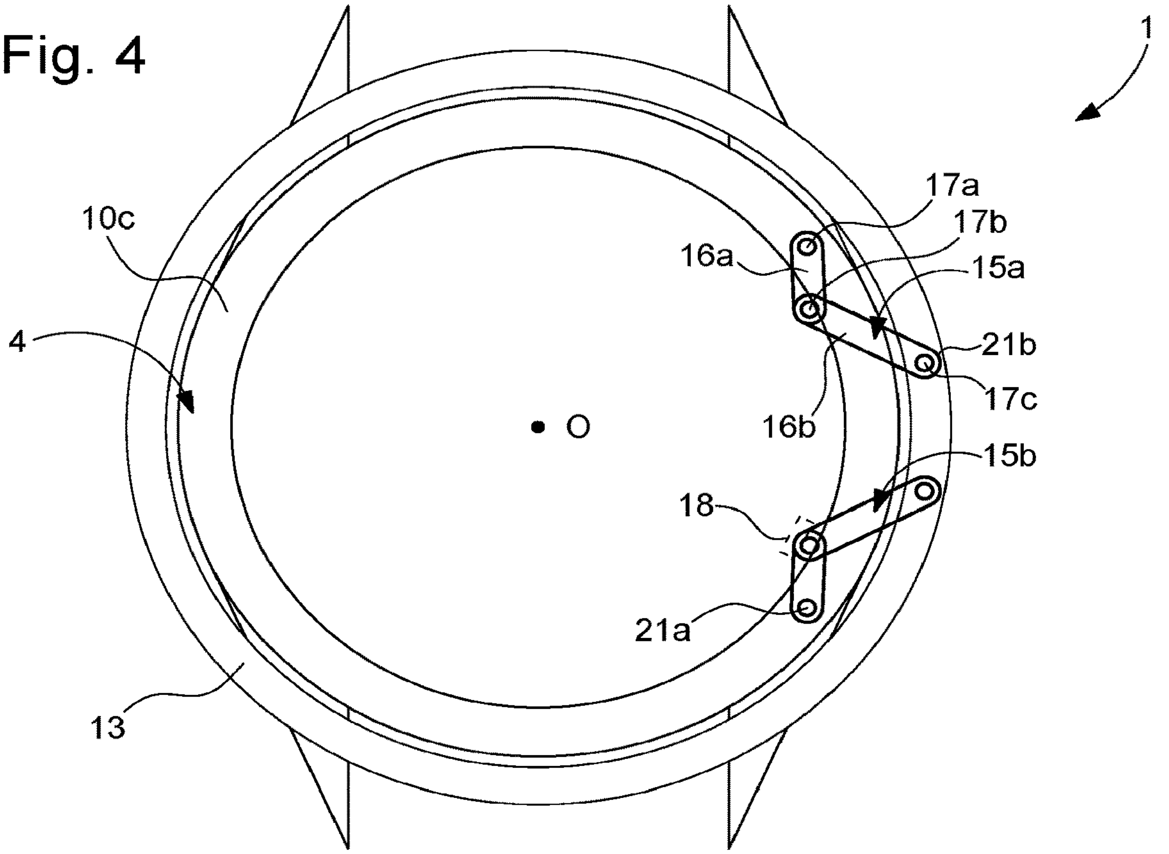

With reference to FIGS. 2 to 4, the Dewar device 1 comprises two lever elements 15*a*, 15*b* provided to activate two separate push buttons of the case 6 of the watch 3. These two lever elements 15*a*, 15*b* are arranged near or in the vicinity of the corresponding push buttons of the case 6 with which they are intended to cooperate indirectly or directly. In these FIGS. 2 to 4, the first and second push buttons are arranged on a middle of the watch case 6 respectively in the "2 o'clock" and "4 o'clock" areas.

In FIG. 2, the pivoting bezel 13 of the Dewar device 1 is driven by a rotational movement 20 performed in a counter-clockwise direction, that is to say from right to left. This movement of the bezel 13 allows to configure the first lever element 15*a* in the activation state during which its actuation area 18 causes the activation of the first push button of the watch 3 case 6. It will be noted during this configuration of this first lever element 15*a* in this activation state that the first and second parts 16*a*, 16*b* of the second lever element 15*b* articulate with each other so that the three fastening elements 17*a*, 17*b*, 17*c* are substantially aligned or strictly aligned. This alignment of the fastening elements 17*a*, 17*b*, 17*c* of this second lever element 15*b* contributes in that the latter has a generally rectilinear shape.

In FIG. 3, the pivoting bezel 13 of the Dewar device 1 is driven by a rotational movement performed in a direction similar to that of the hands of a watch, that is to say from left to right. This movement of the bezel 13 allows to configure the second lever element 15*b* in the activation state during which its actuation area 18 causes the activation of the second push button of the watch 3 case 6. It will be noted during this configuration of this second lever element 15*b* in this activation state that the first and second parts 16*a*, 16*b* of the first lever element 15*a* articulate with each other so that its three fastening elements 17*a*, 17*b*, 17*c* are substantially aligned or strictly aligned. This alignment of the fastening elements 17*a*, 17*b*, 17*c* of this first lever element 15*a* contributes in that the latter has a generally rectilinear shape.

Furthermore, as mentioned above, the first and second lever elements 15*a*, 15*b* illustrated in FIG. 4 are both in the inactivation state during which the first and second parts 16*a*, 16*b* of each of them together form an obtuse angle.

It is understood that such an actuation device 19 allows to improve the use of the Dewar device 1, in particular when the user of this device 1 is not very skilled in the portion of his body which allows him to handle it. This lack of skill may result from a disability or from the fact that this user wears thick gloves on his hands which prevent him from being precise with his fingers to handle this Dewar device 1. In this context, it should be noted that such a Dewar device 1 is particularly adapted for use by astronauts dressed in their spacesuits or more generally by users/adventurers in spacesuits operating in environments where extreme conditions prevail in terms, for example, of pressure, temperature, humidity, etc.

As seen previously, the watch 3 case 6 is arranged in the enclosure 5 of the casing 4 while being kept remote or at a distance from all the elements 10*a* to 10*c* of this casing 4. This remoteness or this distance or else this spacing is configured from at least one device 7 for fastening the watch 3 case 6 in the casing 4. In other words, the fastening device 7 is configured to achieve or maintain a spacing between said case 6 and all the elements 10*a*, 10*b*, 10*c* of the casing 4 forming said enclosure 5 of this casing 4. This fastening device 7 participates in reducing or even eliminating any heat conduction between the inner peripheral wall 12*a* of the middle 10*c* and/or the back 10*b* and/or the crystal 10*a* with the watch 3 case 6 in particular with an overall outer face of this case 6. This overall outer face includes an upper face comprising the crystal 11 of the case 6 of this watch 3, a lower face comprising a back of said case 6 and an outer peripheral wall of a middle of this case 6. It is understood that the lower and upper faces are opposite one another. It will be noted that the fastening device 7 is arranged on an inner peripheral wall 12 of the enclosure of the casing 4. In this configuration the fastening device 7 mechanically connects, in particular in a reversible manner, the watch 3 case 6 to the inner peripheral wall 12 of the enclosure of the casing 4. Furthermore, the Dewar device 1 may comprise two fastening devices 7 arranged in the enclosure 5 while being opposite one another.

It will be noted that such a case 6 is comprised in a watch 3 which can be an electronic watch, for example a quartz watch, or else a mechanical watch.

The mechanical and/or functional components 2 of the watch 3, mentioned above, comprise in a non-limiting and non-exhaustive manner: mechanical elements of the movement such as a balance-spring, wheels, a striking mechanism, a dial, hands, rings, seals and/or electronic and/or electrical components 2. It will be noted in particular that such electronic and/or electrical components 2 include for example a display device, a processor, a memory, an energy storage component, a motor, an integrated circuit and an electronic oscillator, etc.

It is therefore understood that in this configuration, this Dewar device 1 has the same properties and features as a Dewar tube/vase which is well-known in the prior art. As previously mentioned, the properties and features of this Dewar device 1 contribute to providing it with good thermal insulation with regard to particularly extreme temperatures that may prevail in the external environment wherein such a device 1 can be located.

As already seen, the crystal 10*a*, the middle 10*c* and the back 10*b* of this device 1 together define the enclosure 5 of this casing 4 which is capable of receiving the watch 3 case 6. These three elements 10*a* to 10*c* of the casing 4 namely the middle 10*c*, the crystal 10*a* and the back 10*b* can be separate elements which are joined together to construct this enclosure 5. Alternatively, the middle 10*c* and the back 10*b* of the casing 4 can together form a single piece, said single piece defining an opening opposite the back 10*b* which is capable of being closed by the crystal 10*a* in a reversible and sealed manner. Alternatively, the middle 10*c* and the crystal 10*a* of the watch 3 casing 4, can together form a single piece, said single piece defining an opening opposite the crystal 10*a* which is capable of being closed by the back 10*b*, also in a reversible and sealed manner.

The middle 10*c* or the back 10*b* can also be, like the glass 10*a*, a transparent external element of the casing 4 of the Dewar device 1. In such a configuration, the inner peripheral wall 12 of the middle 10*c* and the inner face of the back 10*b* can be plated with a metallic reflective plating or the like, such as for example a layer of silver.

It will however be noted that the middle 10*c* or the back 10*b* are preferably made in a non-limiting and non-exhaustive manner of a metallic material or of thermosetting or thermoplastic polymer resins reinforced with carbon or glass fibres or else of ceramic materials.

In addition, the device 1 may comprise an interferometric filter arranged on an overall outer face of the casing 4, namely on an outer peripheral wall of the middle 10*c* and/or outer faces of the crystal 10*a* and of the back 10*b* of this watch 3 case 6. This interferometric filter can be a grid or a trellis forming a plating on this overall outer face of the casing 4. This grid or trellis has a mesh whose dimensions are such that they only allow certain predetermined wavelengths of the electromagnetic spectrum to pass, typically the wavelengths of the visible domain.

Furthermore, when the device 1 is intended to be used in an environment comprising air, the enclosure 5 of the casing 4 comprising the watch case 6, is under vacuum or almost under vacuum. In other words, in this enclosure, the space defined between this case 6 and the inner peripheral wall 12 of the middle 10*c*, the back 10*b* and the crystal 10*a* is empty of material or almost empty. It will be noted that when this device 1 is used in an environment devoid of air or substantially devoid of air, its enclosure may not be under vacuum, or on the contrary also be under vacuum or almost under vacuum.

Such a Dewar device 1, the use or handling of which is facilitated thanks to the actuating device, contributes to providing the mechanical and/or functional components 2 of the watch 3 with very good thermal insulation vis-à-vis the external environment by reducing or even preventing heat loss by radiation of the components arranged in the watch case 6 for a long time. Thus, when the temperature outside the device 1 reaches extreme values, typically of the order of −125 to +125° C., the temperature inside the enclosure 5 in turn remains substantially equal to the temperature present in the watch 3 case 6 when it is arranged in the casing 4, typically of the order of 20° C. It will be noted that regardless of the temperature conditions prevailing in the environment of the Dewar device 1, the temperature present in the watch 3 case 6 is a temperature which does not hinder the proper operation of the watch. This temperature is maintained over a period of time which is 5 to 18 times greater than the period during which such a watch case would be able to preserve an operating temperature of its components 2 by being located directly in such an environment where such particularly extreme temperatures prevail (that is to say by being located outside the casing of the Dewar device). It can thus be seen that such a configuration allows to protect the mechanical and/or functional components 2 of the watch 3, as well as to participate in ensuring their operation in an optimal manner in extreme external temperature conditions.

The invention claimed is:

1. A Dewar device for mechanical and/or functional components of a watch, said device comprising:

a bracelet;

a casing including an enclosure wherein a case of said watch can be disposed so that a crystal of said case is arranged opposite a crystal of said casing;

at least one fastening device fastening said watch case in said enclosure of the casing by keeping it the watch case spaced apart from all elements of the casing defining said enclosures; and a device for actuating at least one push button by rotating a pivoting bezel of said casing.

2. The Dewar device according to claim 1, wherein said device for actuating said at least one push button comprises said pivoting bezel which is configured to participate in the actuation of said at least one push button when it the pivoting bezel performs a rotational movement around a central axis of the pivoting bezel.

3. The Dewar device according to claim 1, wherein said pivoting bezel is movable in rotation relative to a middle of the casing.

4. The Dewar device according to claim 1, wherein the actuating device comprises the pivoting bezel, a middle of the casing and at least one deformable lever element.

5. The Dewar device according to claim 4, wherein said at least one lever element comprises a first end fastened to a middle of the casing and a second end fastened to the pivoting bezel.

6. The Dewar device according to claim 4, wherein said at least one lever element comprises a first end fastened to a middle of the casing and a second end fastened to the pivoting bezel, the at least one lever element comprising first and second parts of different sizes movably connected together by a fastening element.

7. The Dewar device according to claim 4, wherein said at least one lever element comprises a first end fastened to a middle of the casing and a second end fastened to the pivoting bezel, the at least one lever element comprises connecting elements capable of ensuring a movable fastening of said lever element to the middle and to the bezel of the casing.

8. The Dewar device according to claim 4, wherein said at least one lever element comprises a first end fastened to a middle of the casing and a second end fastened to the pivoting bezel, the at least one lever element comprising first and second parts of different sizes movably connected together by a fastening element, the first and second parts being interconnected at connecting ends forming an actuation area of said at least one lever element.

9. The Dewar device according to claim 4, wherein said at least one lever element comprises an actuation area capable of activating the push button of the watch by contacting at least one activation area of a middle.

10. The Dewar device according to claim 4, wherein said at least one lever element comprises an actuation area capable of activating the push button of the watch by contacting at least one activation area of a middle, the activation area comprising a sliding member arranged in the middle capable of contacting the push button of the watch when the push button is acted upon by said at least one lever element.

11. The Dewar device according to claim 4, wherein said at least one lever element comprises an actuation area capable of activating the push button of the watch by directly contacting said button.

12. The Dewar device according to claim 1, wherein said enclosure is under vacuum or almost under vacuum.

* * * * *